US010225586B2

(12) United States Patent
Lallet

(10) Patent No.: US 10,225,586 B2
(45) Date of Patent: Mar. 5, 2019

(54) METHOD FOR TRANSMITTING VIDEO SURVEILLANCE IMAGES

(71) Applicant: AIRBUS DS SAS, Elancourt (FR)

(72) Inventor: Arthur Lallet, La Flamengrie (FR)

(73) Assignee: AIRBUS DS SAS, Elancourt (FR)

( * ) Notice: Subject to any disclaimer, the term of this patent is extended or adjusted under 35 U.S.C. 154(b) by 0 days.

(21) Appl. No.: 15/512,903

(22) PCT Filed: Sep. 22, 2015

(86) PCT No.: PCT/EP2015/071770
§ 371 (c)(1),
(2) Date: Mar. 21, 2017

(87) PCT Pub. No.: WO2016/046219
PCT Pub. Date: Mar. 31, 2016

(65) Prior Publication Data
US 2017/0302977 A1 Oct. 19, 2017

(30) Foreign Application Priority Data
Sep. 22, 2014 (FR) ..................................... 14 02125

(51) Int. Cl.
*H04N 21/2343* (2011.01)
*H04N 7/18* (2006.01)
(Continued)

(52) U.S. Cl.
CPC ... *H04N 21/234327* (2013.01); *H04L 65/601* (2013.01); *H04N 7/18* (2013.01);
(Continued)

(58) Field of Classification Search
CPC .. H04N 21/23427; H04N 19/30; H04N 19/70; H04N 7/18; H04N 21/2146; H04N 21/2187; H04N 21/6587; H04L 65/601
See application file for complete search history.

(56) References Cited

U.S. PATENT DOCUMENTS 7,859,571 B1 * 12/2010 Brown ............... H04N 21/2187
348/211.3
2006/0259933 A1 11/2006 Fishel et al.
(Continued)

FOREIGN PATENT DOCUMENTS

WO  WO 2004/071098 A1  8/2004

OTHER PUBLICATIONS

International Search Report as issued in International Patent Application No. PCT/EP2015/071770, dated Dec. 23, 2015.
(Continued)

*Primary Examiner* — Pankaj Kumar
*Assistant Examiner* — Alexander Boyd
(74) *Attorney, Agent, or Firm* — Pillsbury Winthrop Shaw Pittman LLP

(57) ABSTRACT

A method of transmission by a surveillance device to a control room, via a telecommunications network, of a series of images, includes steps, implemented by the surveillance device, of acquisition of a series of images, of coding of the series of images acquired into a series of base video frames including a first quantity of information and into at least one series of enhancement video frames of the series of base video frames, the series of enhancement video frames including a second quantity of information making it possible to enhance the quality of the series of images coded into the series of base video frames, of transmission in real time via the telecommunications network of at least the series of base video frames to the control room, and of storage of at least the series of enhancement video frames.

10 Claims, 2 Drawing Sheets

(51) Int. Cl.
*H04N 21/214* (2011.01)
*H04N 21/2187* (2011.01)
*H04N 21/6587* (2011.01)
*H04N 19/30* (2014.01)
*H04N 19/70* (2014.01)
*H04L 29/06* (2006.01)

(52) U.S. Cl.
CPC ............. *H04N 19/30* (2014.11); *H04N 19/70* (2014.11); *H04N 21/2146* (2013.01); *H04N 21/2187* (2013.01); *H04N 21/6587* (2013.01)

(56) References Cited

U.S. PATENT DOCUMENTS

| | | | |
|---|---|---|---|
| 2008/0294789 | A1 | 11/2008 | Nassor et al. |
| 2010/0272187 | A1* | 10/2010 | Civanlar ........ H04N 21/234327 375/240.25 |
| 2012/0307049 | A1* | 12/2012 | Mimar ............. G08B 13/19676 348/143 |
| 2014/0267714 | A1* | 9/2014 | Mistry ................. H04N 21/631 348/143 |
| 2015/0304735 | A1* | 10/2015 | Dutta ................. H04N 21/2146 725/62 |

OTHER PUBLICATIONS

Preliminary Search Report as issued in French Patent Application No. 1402125, dated Jun. 17, 2015.

* cited by examiner

METHOD FOR TRANSMITTING VIDEO SURVEILLANCE IMAGES

CROSS-REFERENCE TO RELATED APPLICATIONS

This is the U.S. National Stage of PCT/EP2015/071770, filed Sep. 22, 2015, which in turn claims priority to French Patent Application No. 1402125, filed Sep. 22, 2014, the entire contents of all applications are incorporated herein by reference in their entireties.

TECHNICAL FIELD AND OBJECT OF THE INVENTION

The present invention relates to the field of video and relates more particularly to a method, a device and a system for transmitting video surveillance images.

The invention in particular finds application in the field of remote analysis of images acquired by one or more cameras, for example onboard a vehicle.

STATE OF THE ART

Video surveillance systems are used in a known manner for security purposes, in particular in public spaces. The cameras of these systems, which can be fixed or onboard vehicles, are connected, via a telecommunications network, to a control room in which an operator views the images.

In existing onboard solutions, the surveillance device is mounted in an automotive vehicle and comprises an image acquiring unit comprising one or more video cameras, a unit for coding the acquired images and a unit for storing the coded images having for example the form of a hard disk.

Coding is a process making it possible to compress images in a given coding format such as, for example, the H.264 AVC video format or the Motion JPEG format, for the purpose of storing or transmitting them. A series of images acquired by a camera is thus coded as a series of video frames in the chosen format.

Some formats strongly compress the images so as to dramatically reduce the data volume they represent in order to be able to readily transmit them via a telecommunications network while consuming little of its bandwidth. Such formats are called "low quality" formats and are characterized by a low resolution and a low number of video frames per second, for example 10 frames/s.

Other formats known as "high quality" formats do not compress much the images so as to preserve a high detail level while using a standard format which can be readily stored and decoded. Such formats are characterized by a high resolution and a high number of video frames per second, for example 25 frames/s.

In a known solution, a video camera first acquires a series of images from the environment of the vehicle, and then the coding unit codes them into a series of video frames in a low quality format so as to be able to transmit them in real time to the control room where they are decoded into a series of images for an operator to be able to perform remote surveillance of the environment of the vehicle. By the terms "real time", it is meant here and in all the rest that coded video frames are directly transmitted after being coded via a telecommunications network within a delay representing the time for conveying these coded video frames through said telecommunications network.

Low quality images decoded from video frames received in real time generally do not make it possible to distinctly view the details of an image enabling, for example, a person's face to be identified, which can be a major drawback, in particular upon obtaining evidence within the context of a trial or lawsuit.

In order to overcome this drawback, a known solution consists in coding the images acquired by the video camera in a first low quality coding format, on the one hand, and in a second high quality coding format, on the other hand.

The video frames coded in the first coding format are directly transmitted in real time by the transmitting unit to the control room via the telecommunications network but are not stored in the storage unit of the vehicle.

Conversely, the video frames coded in the second coding format are not transmitted in real time to the control room, because this would consume a too high quantity of bandwidth of the telecommunications network. These video frames are firstly stored in the storage unit of the vehicle and then secondly transferred in a storage module of the control room, for example when the vehicle comes back to its parking space between two uses, for the purpose of being possibly exploited at a later point.

There is a problem when an operator of the control room, who has detected an event in the images decoded from low quality video frames received in real time, wants to retrieve said event in the images decoded from the high quality video frames stored in the storage module of the control room.

Indeed, in this case, the operator should manually search for the event in the high quality images because the low quality images coded in the first coding format are not related to or synchronized with the high quality images coded in the second coding format. Such a search is very time-consuming and costly, which thus has significant drawbacks.

Furthermore, the operator has to wait for the vehicle to have come back to its parking space and for the video frames coded in the second high quality format to have been extracted from the storage unit of the vehicle and transferred into the storage module of the control room to be able to decode and exploit them, which is another drawback.

Besides, another drawback of this existing solution lies in that video frames coded in both formats are stored as two independent video flows, which makes the management of the storage unit and storage module more complex.

The purpose of the present invention is to overcome these drawbacks by providing a method which is both simple, quick and efficient to transmit a series of images acquired by at least one video camera to a control room via a telecommunications network and determine in a series of high quality images, the images corresponding to a same event viewed beforehand in real time in a series of low quality images.

General Presentation of the Invention

To that end, the object of the invention is to provide a method for transmitting by a surveillance device to a control room, via a telecommunications network, a series of images, said method being noteworthy in that it comprises the steps, implemented by the surveillance device, of:

acquiring a series of images, coding the acquired series of images into a series of base video frames comprising a first quantity of information and into at least one series of enhancement video frames of said series of base video frames, said series of enhancement video frames comprising a second quantity of information making it possible to enhance the quality of the series of images coded into said series of base video frames, transmitting in real time via said telecommunications network at least said series of base video frames to the control room, and storing at least said series of enhancement video frames.

The first quantity of information of the series of base video frames is relatively small, that is the series of base video frames is low quality coded and can be readily transmitted in real time. The second quantity of information of each series of enhancement video frames is also small but enables the quality of base video frames to be incrementally enhanced as one series of enhancement video frames is added. Further, the storage of the one or some series of enhancement video frames enables them to be subsequently exploited, in particular by combining them to the corresponding series of base video frames.

Preferably, the storing step also comprises storing the series of base video frames in order to exploit it subsequently, in particular by combining it with one or more corresponding series of enhancement video frames.

Still preferably, coding the series of images acquired is made into a series of base video frames and into a plurality of series of enhancement video frames in order to enhance the quality of the images.

In this case, the series of enhancement video frames are hierarchized, each series of enhancement video frames comprising a further quantity of information making it possible to enhance the quality of a series of images decoded from said series of base video frames and the series of enhancement video frames with a lower hierarchical level.

Thus, the first series of enhancement video frames is added to the series of base video frames and then each series with an immediately upper level is added to the series with an immediately lower level. In practice, the video frames of a series with an upper level are inserted between the video frames of series with a lower level so as to increase the quantity of information of the video frame flow and thus the quality of the images decoded from said video frame flow. The different series of video frames constitute superimposed layers the number of which determines the quality of the images decoded from said video frames. The quality of the images decoded from the series of base video frames is thus the lowest quality, the least bandwidth consuming quality when transmitted on a communications network. Conversely, the quality of the images decoded from the series of base video frames and all of the series of enhancement video frames of the series of corresponding base video frames is the highest quality.

Advantageously, coding the series of images acquired into a series of base video frames and into at least one series of enhancement video frames is made using a scalable video format, for example of the H.264 SVC (scalable video coding) type.

According to one aspect of the invention, the telecommunications network can be, for example, a Wifi, WIMAX, 3G, 4G, satellite type network or any other suitable telecommunications network known to the man skilled in the art.

In a first embodiment of the method according to the invention, only the series of base video frames is transmitted in real time to the control room.

In a second embodiment of the method according to the invention, the series of base video frames and one or more series of enhancement video frames of the series of base video frames are transmitted in real time to the control room.

Preferably, the method comprises, subsequently to the step of storing the series of enhancement video frames, a step of receiving a request, sent by the control room, for obtaining at least one subset of the one or some series of enhancement video frames of the series of base video frames.

Preferably, such a request comprises a start index and an end index of said subset. Such indices, which are preferably determined in the series of base video frames, make it possible to identify a group of frames among the one or some series of enhancement video frames so as to add the group of enhancement video frames to the corresponding base video frames and thus to enhance the quality of a specific interval of the video frame flow viewed in real time. In other words, such indices make it possible to establish a link between the base video frames sent in real time and the corresponding enhancement video frames, for example stored in a storage unit of the surveillance device.

Still preferably, the method comprises a step of extracting the requested subset of the one or some series of enhancement video frames of the series of base video frames.

According to an aspect of the invention, the method comprises a step of transmitting to the control room, via the telecommunications network, the extracted subset of the one or some series of enhancement video frames.

An operator of the control room can thus remotely request, via the telecommunications network, only the group of enhancement video frames corresponding to the scene he/she wants to view details thereof. This group represents a small quantity of information and can thus be readily extracted and transmitted to the control room by the surveillance device.

Preferably, the method comprises, subsequently to the step of storing the series of enhancement video frames and/or the series of base video frames, a step of transferring, on a storage module of the control room, the stored series of enhancement video frames and/or the stored series of base video frames. Such a transfer makes it possible to store the video frames, for example, in a storage module of the control room such that an operator can then locally use them.

Such a transfer can advantageously be made:

on a radio communication link, for example of the Wifi type, via a telecommunications network, for example of the Wifi, WIMAX, 3G, 4G type, etc., on a wired communication link, for example of the Ethernet cable type, or even, via a temporary storage intermediate unit, for example of the USB key, external hard disk or DVD type.

The invention also relates to a surveillance device for transmitting to a control room, via a telecommunications network, a series of images, said device being noteworthy in that it comprises:

a unit for acquiring a series of images, a unit for coding the acquired series of images into a series of base video frames comprising a first quantity of information and into at least one series of enhancement video frames of said series of base video frames, said series of enhancement video frames comprising a second quantity of information making it possible to enhance the quality of the series of images coded into said series of base video frames, a unit for transmitting in real time via said telecommunications network at least said series of base video frames to the control room, and a unit for storing at least said series of enhancement video frames.

Preferably, the storage unit is configured to store also the series of base video frames.

Still preferably, the surveillance device is mounted in a vehicle, especially an automotive vehicle. Alternatively, the surveillance device can be fixed, for example mounted to a pole or to a wall.

Preferably, the surveillance device is configured to:
- receive a request, sent by the control room, for obtaining at least one subset of the one or some series of enhancement video frames of the series of base video frames,
- extract said requested subset of the one or some series of enhancement video frames of the series of base video frames,
- transmit to the control room, via the telecommunications network, the subset(s) of series of enhancement video frames extracted following the reception of said request.

Preferably, the surveillance device is configured to transfer to a storage module of the control room the stored series of enhancement video frames and/or the series of base video frames on the storage unit.

The invention also relates to a system comprising a surveillance device as previously set forth, a control room and at least one telecommunications network between said surveillance device and said control room, the transmitting unit of the surveillance device being configured to transmit the series of base video frames to the control room via the telecommunications network and the control room being configured to receive the series of base video frames via the telecommunications network.

Preferably, the control room is configured to send to the surveillance device, via the telecommunications network, a request for obtaining at least one series of enhancement video frames and to receive from the surveillance device, via the telecommunications network, the series of enhancement video frames requested following the sending said request.

According to an aspect of the invention, the control room comprises a module for storing the series of enhancement video frames stored on the storage unit of the surveillance device.

According to an aspect of the invention, the control room comprises a video control module configured to display images decoded from coded video frames stored in the storage module.

The invention also relates to a data medium for a computer program comprising instructions for implementing the method according to the invention by a user equipment when the program is run by at least one processor.

Further characteristics and advantages of the invention will appear upon reading the description that follows made in reference to the appended figures given by way of non limiting examples and in which identical references are given to similar objects.

DETAILED DESCRIPTION OF THE INVENTION

Description of One Embodiment of the System According to the Invention

Figure 1:
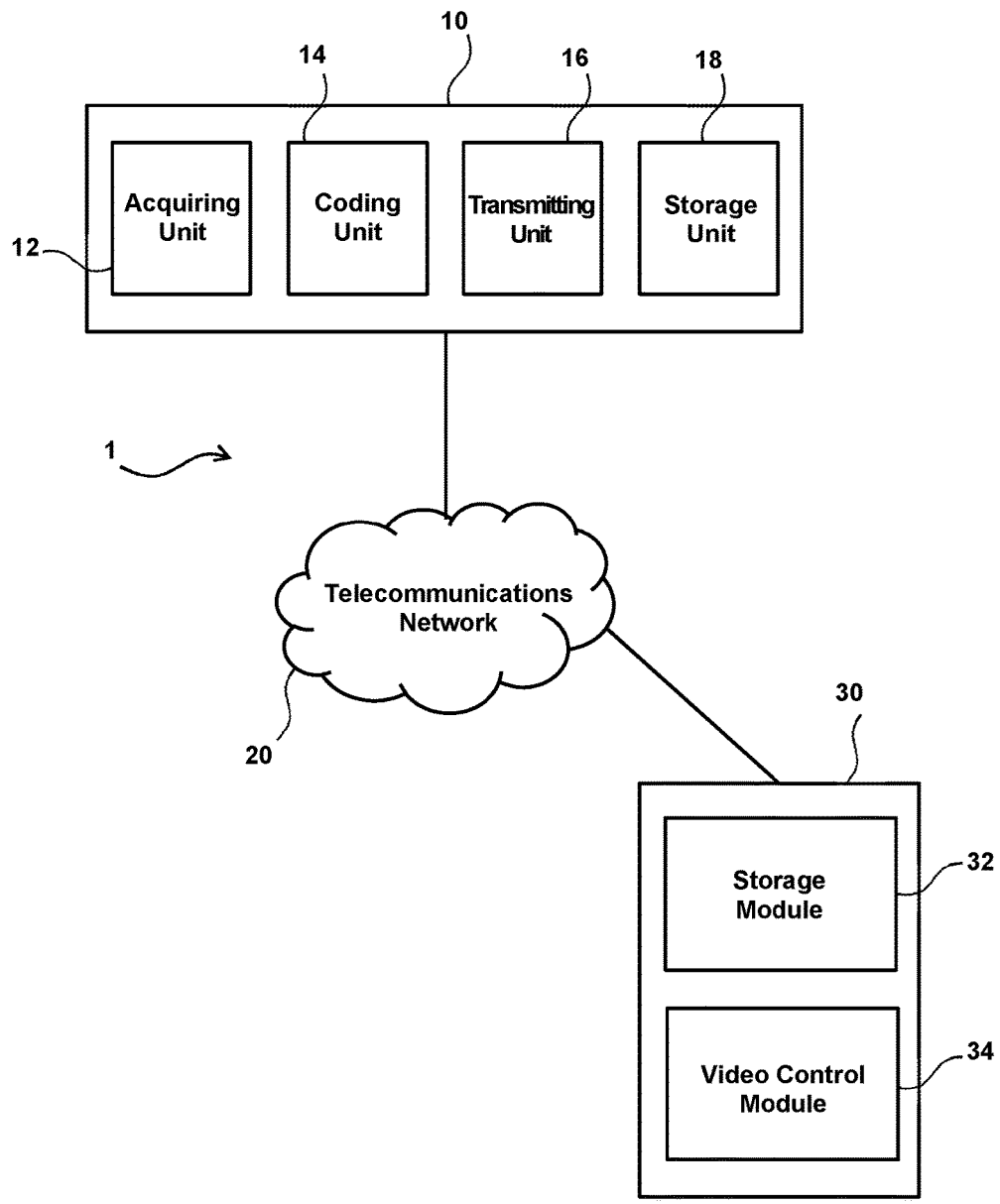
FIG. 1 schematically illustrates one embodiment of the system according to the invention.

FIG. 1 schematically represents one embodiment of the system 1 according to the invention.

I. System 1

In this example, the system 1 comprises a surveillance device 10, a telecommunications network 20 and a control room 30.

a) Surveillance Device 10

The surveillance device 10 is preferably mounted in a vehicle, especially an automotive vehicle. It can however be in the form of a fixed station, for example mounted to a pole or to a wall.

For an operator of the control room 30 to be able to view images of the environment of the surveillance device 10, the surveillance device 10 comprises, as illustrated in FIG. 1, an acquiring unit 12, a coding unit 14, a transmitting unit 16 and a storage unit 18.

The acquiring unit 12 is configured to acquire a series of images of the environment of the surveillance device 10. For example, the acquiring unit 12 can comprise one or more video cameras of the Internal Protocol (IP) and/or analog type known to the man skilled in the art.

These cameras can be autonomous or mounted into one or more video acquisition mobile terminals, for example of the smartphone or Personal Data Assistant type, connected to the vehicle in real time, for example by a communication link of the Wifi, Bluetooth®, Zigbee type or any other suitable link type.

In this example, the coding unit 14 is configured to code a series of images acquired by the acquiring unit 12 into a series of base video frames comprising a first quantity of information and a plurality of enhancement video frames of said series of base video frames.

The series of enhancement video frames are hierarchized, each series of enhancement video frames comprising a further quantity of information making it possible to enhance the quality of a series of images decoded from said series of base video frames and the series of enhancement video frames with a lower hierarchical level.

Thus, the first series of enhancement video frames is added to the series of base video frames and then each series with an immediately upper level is added to the series with an immediately lower level. In practice, the video frames of a series with an upper level are inserted between video frames of the series with a lower level so as to increase the quantity of information of the video frame flow and thus the quality of the images decoded from said video frame flow.

In the terminology of scalable video coding, the series of base video frames is called the base layer and the series of enhancement video frames are called enhancement layers. The different series of video frames thus make up a plurality of superimposed layers the number of which determines the quality of the images decoded from said video frames. The quality of the images decoded from the series of base video frames is the lowest quality, the least bandwidth consuming quality when transmitted on a communications network. Conversely, the quality of the images decoded from the series of base video frames and all the series of the enhancement video frames of the series of corresponding base video frames is the highest quality.

In this example, coding the series of images acquired into a series of base video frames and into a plurality of series of enhancement video frames is made using a scalable video format of the H.264 SVC (Scalable Video Coding) type.

Figure 2:
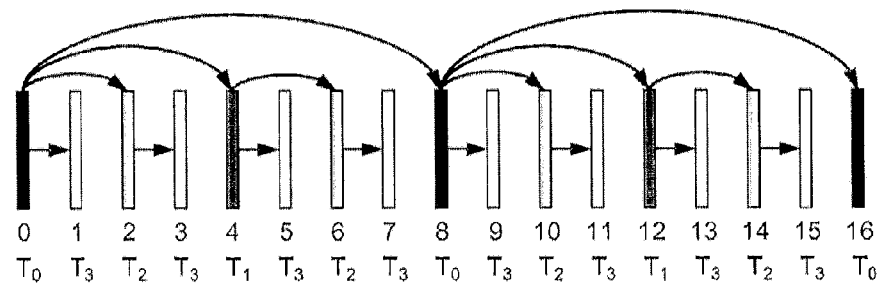
FIG. 2 illustrates an example of a series of video frames comprising a series of base video frames and three series of enhancement video frames.

In reference to FIG. 2, is represented an exemplary scalable video coding of a plurality of images. The plurality of images are coded into a plurality of video frames comprising a series of base video frames T0 and three series of hierarchized enhancement video frames T1, T2 and T3.

The series of base video frames T0 forming the base layer comprises video frames making it possible, once decoded, to build a low quality or minimum quality video flow, for example with a low signal to noise ratio, a smallest image size, a low frequency of frames of the video signal or a combination thereof. The series of base video frames T0 can thus be coded, for example, in a 10 frames per second Common Intermediate Format (CIF) resolution known to the man skilled in the art.

Each series or layer of enhancement video frames comprises video frames respectively T1, T2 and T3 which can be interposed between video frames of the series of base video frames and series of enhancement video frames with a lower hierarchical level so as to make up a video frame flow which, once decoded, has a higher quality than the low quality video flow decoded from the series of base video frames and the series of enhancement video frames with a lower hierarchical level, the enhancement layers with an upper hierarchical level being added, in the hierarchical order, to the enhancement layers with a lower level.

In other words, the one or some series of enhancement video frames each comprise(s) a quantity of information which, added to the quantity of information of the frames of the series of video frames with a lower hierarchical level makes it possible to enhance the quality of the corresponding decoded images. The enhancement layers thus make it possible to enhance the quality of the video flow, but require the availability of one or more layers with a lower quality (i.e. with a lower hierarchical level).

By way of example, the images can be coded into a set of base and enhancement layers with a 25 frames per second High Definition Television (HDTV) 1080i resolution known to the man skilled in the art.

The enhanced video frames T1, T2 and T3 are interposed between the base video frames T0. Each base video frame T0 refers to one or more enhanced video frames T1, T2 and T3 such that the quantities of information contained in the enhanced video frames T1, T2 and T3 complete the quantity of information contained in the base video frames T0 in order to enhance the quality of the images decoded from these video frames.

The series of base video frames T0 and the enhanced video frames T1, T2 and T3 are characterized by frames indices making it possible to identify a determined video frame. It is thus possible to identify, from a start index and an end index, a subset comprising enhancement video frames T1, T2 and T3 included between this start index and this end index.

The transmitting unit 16 is configured to transmit in real time to the control room 30 via the telecommunications network 20 at least the series of base video frames.

According to one aspect of the invention, the transmitting unit 16 is configured to transmit in real time to the control room 30 via the telecommunications network 20 the series of base video frames and one or more series of enhancement video frames of said series of base video frames.

The storage unit 18 is configured to store the series of enhancement video frames of the series of base video frames and possibly the series of base video frames. Such a storage unit 18 can be, for example, in the form of a hard disk or a video recorder.

The surveillance device 10 is configured to receive a request, sent by the control room 30, for obtaining at least one subset of the one or some series of enhancement video frames of the series of base video frames, said request comprising a frame start index and a frame end index.

The surveillance device 10 is also configured to extract, from the frame start index and the frame end index, a subset comprising the enhancement video frames T1, T2 and T3 included between this start index and this end index.

The surveillance device 10 is configured to transmit to the control room 30, via the telecommunications network 20, said extracted subset.

Finally, the surveillance device 10 is configured to transfer to a storage module 32 of the control room 30 the series of enhancement video frames stored on the storage unit 18.

Such a transfer can be made on a radio communication link, for example of the Wifi type, via the telecommunications network 20, on a wired communication link, for example of the Ethernet cable type, or even via a temporary storage intermediate unit, for example of the USB key type.

b) Telecommunications Network 20

The telecommunications network 20 makes it possible to transmit in real time by the surveillance device 10 the series of base video frames to the control room 30.

To that end, the telecommunications network 20 can be, for example, a Wifi, WIMAX, 3G, 4G, satellite network type or any other suitable telecommunications network.

a) Control Room 30

The control room 30 comprises a storage module 32 and a video control module 34.

The storage module 32 makes it possible both to receive and store the series of video frames sent in real time by the surveillance device 10 via the telecommunications network 20, the transferred series of enhancement video frames of the series of base video frames and the subsets of frames of the series of enhancement video frames sent upon request by the surveillance device 10. Such a storage module 32 can for example be in the form of a server.

The video control module 34 comprises a decoder (not represented) enabling an operator to decode video frames stored in the storage module 32 and a screen (not represented) making it possible to view the images decoded from said video frames. It will be noted that the decoder could also be implemented by the storage module 32.

In this example, the video control module 34 is configured to automatically detect a predetermined event in decoded images so as to generate a detection alert for said event.

The control room 30 is configured to send to the surveillance device 10, via the telecommunications network 20, a request for obtaining at least one subset of at least one series of enhancement video frames and to receive from the surveillance device 10, via the telecommunications network 20, said subset(s).

Such a request can be manually sent by an operator or automatically when a detection alert for an event has been generated.

Implementation of the Invention

The method is described for a surveillance device 10 mounted in a vehicle, without of course being restrictive of the scope of the present invention.

Figure 3:
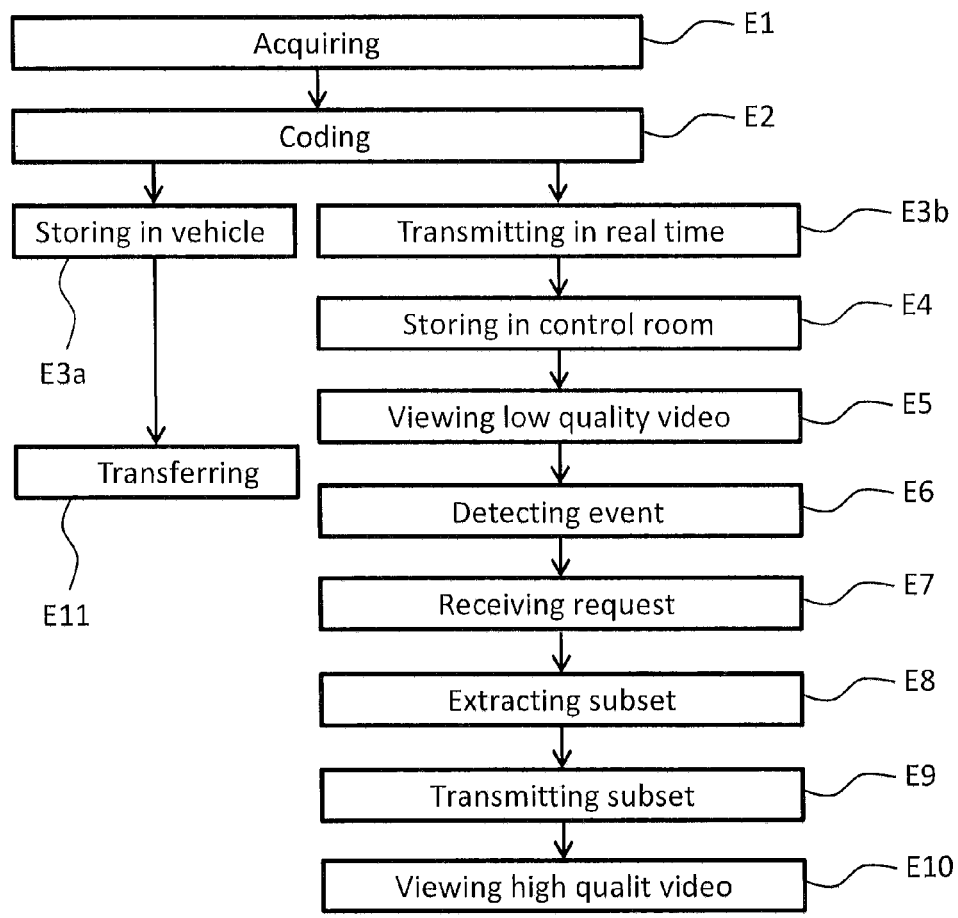
FIG. 3 illustrates an embodiment of the method according to the invention.

In reference to FIG. 3, in a step E1, the acquiring unit 12 acquires images of the environment of the surveillance device 10. The images can be acquired by one or more analog or IP cameras mounted on the vehicle or by one or more mobile cameras, for example of the smartphone type connected to the vehicle, for example through a wireless local area network (WLAN) type terminal, known to the man skilled in the art.

The acquired images are coded by the coding unit 14 in a step E2 into a series of base video frames T0 (base layer)

and into a plurality of series of enhancement video frames T1, T2 and T3 (enhancement layers).

In this example, the series of base video frames T0 and the plurality of series of enhancement video frames T1, T2 and T3 are stored, in a step E3a, in the storage unit 18 of the surveillance device 10.

In parallel, the series of base video frames T0 is transmitted in real time, in a step E3b, by the transmitting unit 16 via the telecommunications network 20, to the storage module 32 of the control room 30. It will be noted that one or more series of enhancement video frames T1, T2 and T3 can also be transmitted with the series of base video frames, for example T1 or T1+T2 or T1+T2+T3.

The storage module 32 transmits the base video frames T0 to the video control module 34 in a step E4 such that an operator (not represented) is able to view them and monitor the environment of the vehicle in real time in a step E5.

When an operator of the control room detects an event by viewing the images decoded from the series of base video frames received in real time from the surveillance device 10 or when the video control module 34 triggers a detection alarm for an event, in a step E6, and the operator then wishes to obtain images with a higher quality of said event, a request for obtaining a subset of the one or some series of enhancement video frames T1, T2 and T3 of the series of base video frames T0 is sent to the surveillance device 10 in a step E7 via the telecommunications network 20.

This request comprises a frame start index and a frame end index delimiting an interval comprising the enhancement video frames illustrating the scene having an interest for the operator.

The request can be manually generated by the operator or automatically, for example by the video control module 34.

When the surveillance device 10 receives the request, it extracts in a step E8 from the storage unit 18, from the frame start index and the frame end index contained in the request, a subset comprising the enhancement video frames T1, T2 and T3 temporally included between this frame start index and this frame end index.

The surveillance device then transmits in step E9, said extracted subset, via the transmitting unit 16 and the telecommunications network 20, to the control room 30 such that the operator can view them, in a step E10, via the video control module 34 and decide whether to trigger an intervention, for example of the security or public health forces, in connection with the event detected.

Once the vehicle is parked at its parking space, the series of enhancement video frames T1, T2 and T3 stored in the storage unit 18 of the surveillance device 10 are transferred in a step E11 to the storage module 32 of the control room 30.

Therefore, the invention provides a quick, simple and efficient solution to transmit video images. Further, it will be noted that no further treatment is necessary during the storage of the series of base video frames and/or of the one or some series of enhancement video frames in the storage module of the control room. Furthermore, the invention makes it possible to save bandwidth of the telecommunications network upon transmitting enhancement video frames subsequently to the transmission of the series of base video frames since the information of the corresponding series of base video frames has been transmitted beforehand in real time and thus does not need to be retransmitted.

It is to be further noted, that the present invention is not limited to the example described above and is open to various alternatives readily accessible to the man skilled in the art. In particular, the shape and configuration of the surveillance device 10 and of the control room 30, the type of telecommunications network 20, the type of scalable video coding should not be construed as being restrictive of the scope of the present invention.

The invention claimed is:

1. A method for transmitting by a surveillance device to a control room, via a telecommunications network, a series of images, said method comprising the steps, implemented by the surveillance device, of:
   acquiring the series of images by the surveillance device;
   coding, by the surveillance device, the series of images acquired into a series of base video frames comprising a first quantity of information and into at least one series of enhancement video frames of the series of base video frames, said at least one series of enhancement video frames comprising a second quantity of information making it possible to enhance the quality of the series of images coded into the series of base video frames;
   transmitting in real time, by the surveillance device, via the telecommunications network the series of base video frames corresponding to the acquired series of images from the surveillance device to the control room;
   storing, in the surveillance device, said at least one series of enhancement video frames corresponding to the acquired series of images;
   subsequent to said transmitting of the base video frames from the surveillance device to the control room, receiving a request, sent by the control room to the surveillance device via the telecommunication network, for obtaining a subset of frames among said at least one series of enhancement video frames, the request comprising a frame start index and a frame end index, wherein the frames of the subset of frames are enhancement video frames of base video frames received by the control room from the surveillance device;
   extracting, by the surveillance device, the requested subset of frames, the frames of the subset being temporally included between the frame start index and the frame end index; and
   transmitting from the surveillance device to the control room, via the telecommunications network, the extracted subset of frames, without transmitting to the control room enhancement video frames associated with the acquired images that are outside the subset of frames,
   wherein the surveillance device is mounted in a vehicle.

2. The method according to claim 1, wherein the storing step also comprises storing the series of base video frames.

3. The method according to claim 1, wherein coding the series of images acquired into the series of base video frames and into said at least one series of enhancement video frames is made using a scalable video format.

4. The method according to claim 3, wherein the scalable video format is H.264 SVC (scalable video coding).

5. The method according to claim 1, further comprising, subsequently to the step of storing said at least one series of enhancement video, a step of transferring, to a storage module of the control room, said at least one stored series of enhancement video.

6. A non-transitory storage medium for a computer program comprising instructions for implementing the method according to claim 1, when the program is run by at least one processor of a surveillance device.

7. A surveillance device for transmitting to a control room, via a telecommunications network, a series of images, said device comprising:
- a unit for acquiring the series of images;
- a unit for coding the series of images acquired into a series of base video frames comprising a first quantity of information and into at least one series of enhancement video frames of the series of base video frames, said at least one series of enhancement video frames comprising a second quantity of information making it possible to enhance the quality of the series of images coded into the series of base video frames;
- a unit for transmitting in real time via the telecommunications network the series of base video frames corresponding to the acquired series of images to the control room; and
- a unit for storing said at least one series of enhancement video frames corresponding to the acquired series of images;

said device being configured to:
- receive a request, sent by the control room, for obtaining a subset of frames among said at least one series of enhancement video frames, the request comprising a frame start index and a frame end index, wherein the frames of the subset of frames are enhancement video frames of base video frames received by the control room from the surveillance device;
- extract the requested subset of frames, the frames of the subset being temporally included between the frame start index and the frame end index; and
- transmit to the control room, via the telecommunications network, the extracted subset of frames, without transmitting to the control room enhancement video frames associated with the acquired images that are outside the subset of frames, wherein the surveillance device is mounted in a vehicle.

8. A system comprising a surveillance device according to claim 7, a control room and at least one telecommunications network between said surveillance device and said control room, the unit for transmitting of the surveillance device being configured to transmit the series of base video frames to the control room via the telecommunications network and the control room being configured to receive the series of base video frames via the telecommunications network.

9. The surveillance device according to claim 7, wherein the vehicle is an automotive vehicle.

10. A system comprising a surveillance device according to claim 7 a control room and at least one telecommunications network between said surveillance device and said control room, the unit for transmitting of the surveillance device being configured to transmit the series of base video frames to the control room via the telecommunications network and the control room being configured to receive the series of base video frames via the telecommunications network.

* * * * *